(12) United States Patent
Chen et al.

(10) Patent No.: US 8,564,448 B2
(45) Date of Patent: Oct. 22, 2013

(54) PORTABLE COMPUTER SYSTEM

(75) Inventors: Pi-Chi Chen, New Taipei (TW);
Wei-Ting Yen, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 328 days.

(21) Appl. No.: 13/049,008

(22) Filed: Mar. 16, 2011

(65) Prior Publication Data
US 2012/0075106 A1     Mar. 29, 2012

(30) Foreign Application Priority Data

Sep. 23, 2010   (TW) .............................. 99132234 A

(51) Int. Cl.
*G08B 21/00*    (2006.01)

(52) U.S. Cl.
USPC ....................................... 340/636.15; 702/63

(58) Field of Classification Search
USPC ........... 340/636.15, 636.1, 636.2; 702/63–65; 320/48, 137, 149
See application file for complete search history.

(56) References Cited

U.S. PATENT DOCUMENTS 6,252,511 B1 *   6/2001   Mondshine et al. ........ 340/636.1
2007/0239296 A1 * 10/2007  Aoyagi et al. .................. 700/94

* cited by examiner

*Primary Examiner* — Toan N Pham
(74) *Attorney, Agent, or Firm* — Rabin & Berdo, P.C.

(57) ABSTRACT

A portable computer system including a battery, a power switch and a computer unit is provided. The battery provides a supply signal to the power switch. The computer unit includes an embedded controller (EC), a driver and a user interface device. The EC determines whether the battery satisfies a low power condition according to the supply signal. If so, the EC provides a driving supply signal. The driver determines whether the supply signal satisfies a low voltage condition according to the driving supply signal. If so, the driver triggers an alert event. The user interface device triggers a user notification event according to the alert event. The power switch is further turned on/off in response to an operation event for respectively providing the supply signal to power the computer unit and put the computer unit in a power cut-off state.

6 Claims, 3 Drawing Sheets

PORTABLE COMPUTER SYSTEM

This application claims the benefit of Taiwan application Serial No. 099132234, filed Sep. 23, 2010, the subject matter of which is incorporated herein by reference.

BACKGROUND OF THE INVENTION

1. Field of the Invention

The invention relates in general to a portable computer system, and more particularly to a portable computer system with a power switch.

2. Description of the Related Art

With the advance in technology, the portable computer system has now been widely used for business processing. In general, the portable computer system has a battery circuit, which provides power to the portable computer system when the wall outlet is unavailable. According to the current technology, the battery circuit of the portable computer system can be categorized into a recognized type or a listed type.

Currently, the portable computer system provides remaining battery life information with operation system software, e.g. the remaining battery life information is provided by the operation system and displayed in a dedicated display area on the screen. How to provide more convenient notification mechanisms for having the remaining battery life information of the portable computer system acknowledged by the user has become a prominent task for the industries.

SUMMARY OF THE INVENTION

The invention is directed to a portable computer system. Compared to the traditional portable computer system, the portable computer system related to the invention is advantageously capable of displaying the remaining battery life information in a more handy way.

According to a first aspect of the present invention, a portable computer system including a battery, a power switch and a computer unit is provided. The battery provides a supply signal. The power switch is electrically connected to the battery for receiving the supply signal. The computer unit includes an embedded controller (EC), a driver and a user interface device. The EC determines whether the battery satisfies a low power condition in response to the supply signal. If so, the EC provides a driving supply signal. The driver determines whether the supply signal satisfies a first low voltage condition according to the driving supply signal. If so, the driver triggers a first alert event related to the level of the supply signal. The user interface device triggers the first user notification event in response to the first alert event. The power switch is turned on in response to the first operation event for providing the supply signal to power the computer unit, and is turned off in response to a second operation event so that the battery and the computer unit substantially float and the computer unit is put in a power cut-off state.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
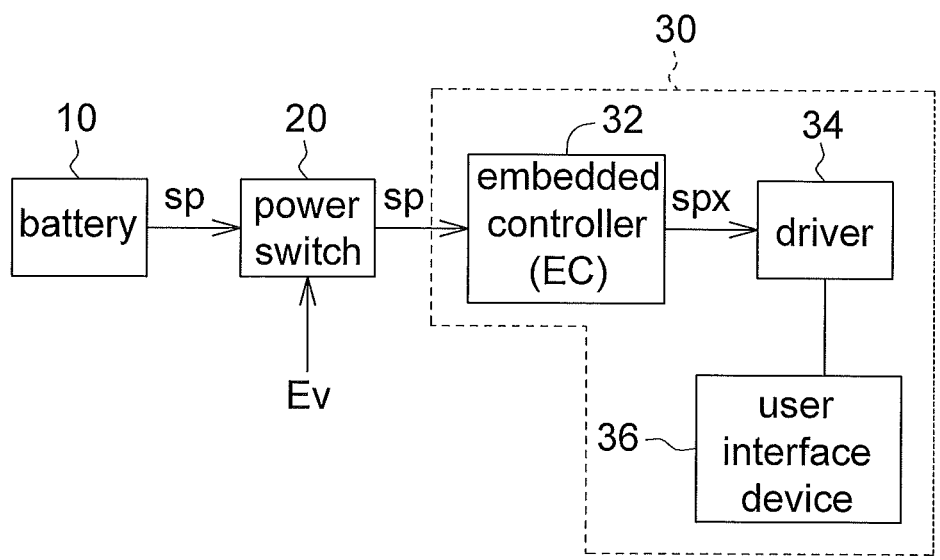
FIG. 1 shows a block diagram of a portable computer system using an embodiment of the invention.

Referring to FIG. 1, a block diagram of a portable computer system using an embodiment of the invention is shown. The portable computer system 1 includes a battery 10, a power switch 20 and a computer unit 30. The battery 10 and the computer unit 30 are electrically connected via the power switch 20. The battery 10 provides a supply signal sp.

Figure 2:
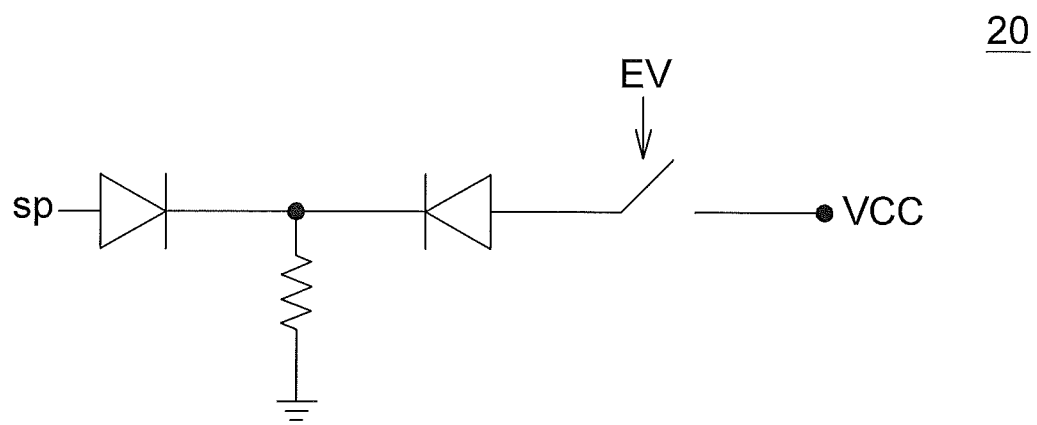
FIG. 2 shows a detailed block diagram of a power switch according to an embodiment of the invention.

The power switch 20 receives the supply signal sp. The power switch 20 is selectively turned on in response to an operation event Ev triggered by a user for providing the supply signal sp to power the computer unit 30. For example, the power switch 20 can be realized by a dip switch with the structure illustrated in FIG. 2. The operation event Ev is an event that the user toggles the power switch 20 to an ON or an OFF position. When the user would like to operate the portable computer system 1, the user toggles the power switch 20 to the ON position so that the power switch 20 is turned on in response to the operation event Ev for providing the supply signal sp to the computer unit 30.

The computer unit 30 includes an embedded controller (EC) 32, a driver 34 and a user interface device 36. The EC 32 determines whether the battery 10 satisfies a low power condition in response to the supply signal sp. In an example, the EC 32 estimates the remaining capacity of the battery 10 by performing the Coulomb counting method, so as to calculate the remaining battery life information in high accuracy. When the EC 32 determines that the remaining capacity of the battery 10 is smaller than or equal to a specific threshold value, the EC 32 determines that the battery 32 satisfies the low power condition and correspondingly provides a driving supply signal spx to the driver 34. For example, the same voltage level of the driving supply signal spx is substantially the same with that of the supply signal sp provided by the battery 10, and the specific threshold value can be set as the threshold power level at which the battery 10 performs dynamic compensation end of discharge voltage (CEDV). For example, the specific threshold value is set as 7% of the power of the battery 10.

When the driver 34 receives the driving supply signal spx, this implies that the battery 10 satisfies the low power condition. Under such circumstance, the driver 34 determines whether the supply signal sp satisfies the first low voltage condition according to the driving supply signal spx. For example, the first low voltage condition is the condition that the voltage level of the supply signal sp is substantially lower than the threshold voltage level of the first lower limit. When the supply signal sp satisfies the first low voltage condition, this implies that the driver 34 triggers the first alert event. The user interface device 36 triggers the first user notification event in response to the first alert event to notify the user that the battery 10 is substantially in a low power state. An embodiment is exemplified below for detailed descriptions of the operation of the driver 34 (that is, the user interface device 36) of the present embodiment of the invention.

Figure 3:
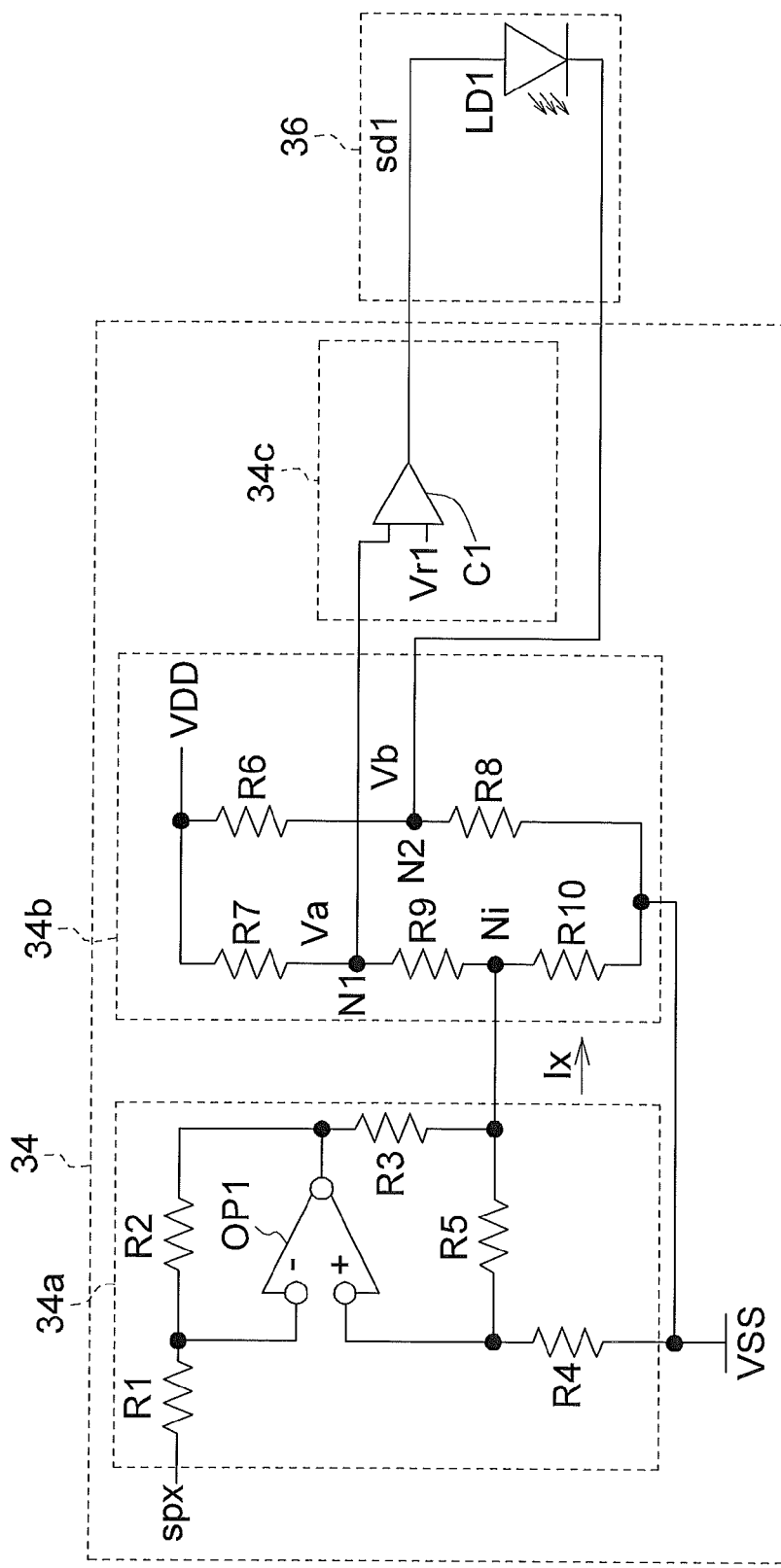
FIG. 3 shows a detailed block diagram of a driver according to an embodiment of the invention.

Referring to FIG. 3, a detailed block diagram of a driver 34 according to an embodiment of the invention is shown. For example, the driver 34 includes a signal converter 34a, a Wheatstone bridge 34b and a comparison circuit 34c as indicated in FIG. 3. The signal converter 34a generates a current conversion signal Ix in response to the driving supply signal spx. For example, the signal converter 34a includes an operation amplifier OP1 and resistors R1, R2, R3, R4 and R5 arranged in a negative feedback configuration. When the driving supply signal spx is in a higher voltage level, the current conversion signal Ix provided by the signal converter 34a has a lower current value. When the driving supply signal spx is in a lower voltage level, the current conversion signal Ix provided by the signal converter 34a has a higher current value.

The Wheatstone bridge 34b provides control voltage signals Va and Vb, and further determines a differential voltage signal Vx between the control voltage signals Va and Vb in response to the current conversion signal Ix, wherein the magnitude of the differential voltage signal Vx is related to the value of the current conversion signal Ix, the supply signal sp and the voltage level of the driving supply signal spx. For example, the Wheatstone bridge 34b includes nodes N1, N1, N2, and resistors R6, R7, R8, R9 and R10. The node Ni is for receiving a current conversion signal Ix, and the nodes N1 and N2 are respectively used for outputting control voltage signals Va and Vb. One ends of the resistors R6 and R8 are respectively used for receiving a reference high level signal VDD and a reference low level signal VSS, and the other ends are respectively coupled to the node N2. One ends of the resistors R7 and R9 are respectively used for receiving the reference high level signal VDD and coupled to a signal input stage point Ni. The other ends are coupled to the node N2. The two ends of the resistor R10 are respectively coupled to a signal input node Ni and used for receiving the reference low level signal VSS.

To put it in greater details, the control voltage signal Va, Vb and the differential voltage signal Vx respectively satisfy the following formulas:

$$Va = \frac{5 \times (R9 + R10)}{R7 + R9 + R10} + Ix \times R10$$

$$Vb = \frac{5 \times R8}{R6 + R8}$$

$$Vx = Va - Vb = \frac{5 \times (R9 + R10)}{R7 + R9 + R10} - \frac{5 \times R8}{R6 + R8} + (Ix \times R10)$$

In an embodiment, the resistors R6 to R10 satisfy the following conditions:

$R7 \times R8 = R6 \times (R9 + R10)$ $R9 >> R10$ $R7 + R9 >> R10$

By applying the above conditions to the above formulas of the differential voltage signal Vx, the differential voltage signal Vx can be obtained as follows:

$Vx = Va - Vb = Ix \times R10$

In other words, the differential voltage signal Vx is substantially equal to the voltage established when the current conversion signal Ix flows through the resistor R10. Provided that the signal converter 34a has not yet received the driving supply signal spx and the current conversion signal Ix is substantially equal to 0, the Wheatstone bridge 34b is in a voltage balance state, and it can be inferred that voltage levels of the reference voltage signals Va and Vb are substantially the same, and the differential voltage signal Vx is equal to 0.

Provided that the signal converter 34a receives the driving supply signal spx and the current conversion signal Ix is larger than 0, the voltage levels of the reference voltage signals Va and Vb are different, and the differential voltage signal Vx is substantially equal to the voltage established when the current conversion signal Ix flows through the resistor R10. Thus, when the levels of the supply signal sp and the driving supply signal spx decrease as the battery 10 discharges, the current conversion signal Ix correspondingly has higher current value, and the differential voltage signal Vx also has higher voltage level.

The comparison circuit 34c includes a comparator, C1 which determines whether the differential voltage signal Vx is substantially larger than a threshold value Vr1, so as to determining whether the supply signal sp satisfies the first low voltage condition (that is, whether the level of the supply signal sp is substantially lower that the first lower limit threshold value). When the differential voltage signal Vx is substantially larger than the threshold value Vr1, this implies that the supply signal sp satisfies the first low voltage condition, and the comparator C1 provides an enabling control signal Sd1 to trigger the first alert event. When the differential voltage signal Vx is smaller than the threshold value Vr1, this implies that the supply signal sp does not satisfy the first low voltage condition, and the comparator C1 provides a non-enabling control signal sd1 accordingly.

The user interface device 36 includes a light emitting diode LD1 turned on in response to the enabling control signal sd1 for correspondingly generating an alert optical signal, which triggers the first alert event to notify the user that the battery 10 is substantially in a low power state. Thus, the driver 34 determines whether the supply signal sp satisfies the first low voltage condition, and further controls the user interface device 36 to trigger the first alert event when the supply signal sp satisfies the first low voltage condition.

In the present embodiment of the invention, the comparison circuit 34c includes a comparator C1, which determines whether the differential voltage signal Vx is substantially larger than the threshold value Vr1 so as to determine whether the supply signal sp satisfies the first low voltage condition (that is, whether the level of the supply signal sp is substantially lower that the first lower limit threshold value). However, the comparator 34C is not limited to the above exemplification.

Figure 4:
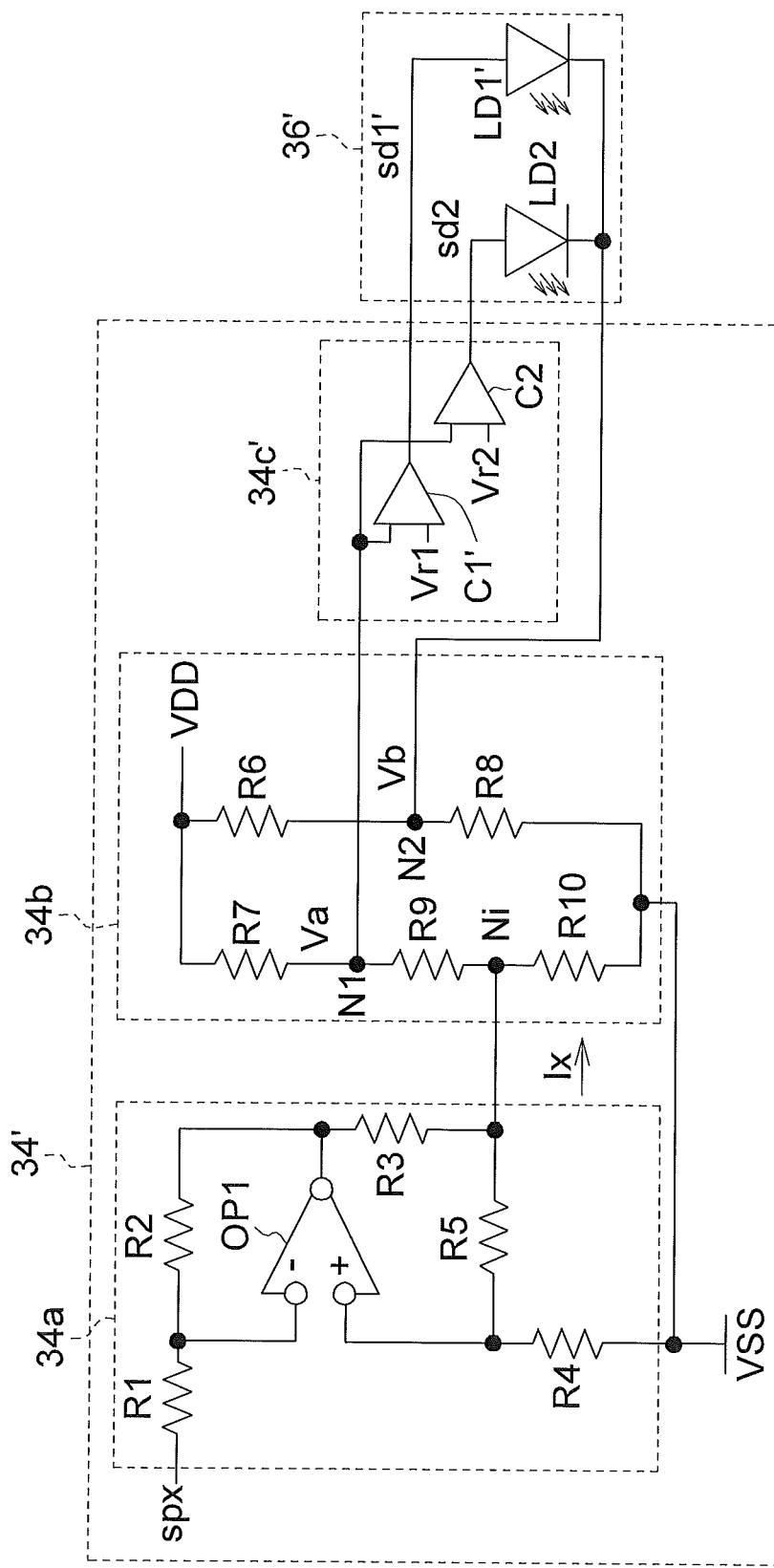
FIG. 4 shows another detailed block diagram of a driver according to an embodiment of the invention.

In other examples, the comparison circuit 34c' may include two comparators C1' and C2, wherein the comparator C2 determines whether the differential voltage signal Vx is substantially larger than a threshold value Vr2, so as to determine whether the supply signal sp satisfies the second low voltage condition and correspondingly provide a control signal sd2 as indicated in FIG. 4. For example, the second low voltage condition is whether the level of the supply signal sp is substantially lower than a second lower limit threshold value, wherein the second lower limit threshold value is smaller than the first lower limit threshold value for example. Thus, under the circumstance that the battery 32 satisfies the low power condition, the driver 34 provides an enabling control signal Sd1' to trigger the first alert event when the supply signal sp satisfies the first low voltage condition, and provides enabling control signal sd1' and sd2 to trigger a second the alert event when the supply signal sp satisfies the second low voltage condition.

In the present example, the user interface device 36' includes light emitting diodes LD1' and LD2, which are respectively turned on according to the enabling control signals sd1' and sd2 for correspondingly generating an alert optical signal, which triggers the second alert event to notify the user that the battery 10' is substantially in a low power state.

In the present embodiment of the invention, the user interface device 36 includes a light emitting diode LD1 which is turned on for generating an alert optical signal to triggers the first alert event. However, the user interface device 36 of the present embodiment of the invention is not limited to the above exemplification. In other examples, the driver 34 can be realized by an audio driver integrating an audio coder decoder (CODEC) and an audio amplifier, and the user interface device 36, realized by a speaker, can generate an alert audio signal to trigger the first alert event.

The above disclosure describes the operation of the portable computer system 1 of an embodiment of the invention when the power switch 20 is turned on in response to an operation event Ev and the supply signal sp generated by the battery 10 is correspondingly provided to the computer unit 30. Relatively, in the operation when the power switch 20 is turned off in response to an operation event Ev triggered by a user, the battery 10 and the computer unit 30 are substantially floating because the power switch 20 is turned off. Thus, the computer unit 30 is correspondingly in a power cut-off state.

In general, the battery 10 has a control chip, which compulsorily terminates the charge/discharge of the battery 10 once over voltage, over current or over temperature occurs, hence providing over voltage protection, over current protection and over temperature protection to the battery 10. Once the control chip compulsorily terminates the charge/discharge of the battery 10, the user normally has to perform re-plug in order to re-set the battery 10. The portable computer system 1 of the present embodiment of the invention has a power switch 20, which selectively cuts off the power supply path between the battery 10 and the computer unit 30. Thus, the user can switch the power switch 20 to re-set the battery, and the re-setting achieved by operating the power switch 20 is substantially the same with that achieved by re-plugging the battery 10. Compared to the conventional portable computer system, the portable computer system of the invention embodiment is advantageously capable of having the re-setting operation of the battery more handy for the user.

For example, the portable computer system of the present embodiment of the invention has a real-time clock circuit, which includes a real-time clock generation circuit and a real-time clock power supply battery. The real-time clock generation circuit can be selectively powered by the system power (such as the battery 10 or a power supplier) of the portable computer system or a real-time clock power supply battery. Before the system power is supplied to the portable computer system, the real-time clock generation circuit performs related clock counting according to the power signal provided by the real-time clock power supply battery for providing corresponding system time information. When the system power is provided to the portable computer system, the real-time clock generation circuit provides clock counting according to the system power.

In addition, the portable computer system of the present embodiment of the invention includes an EC, a driver and a user interface device. The EC determines whether the battery satisfies a low power condition according to the supply signal of the battery, and provides a driving supply signal substantially equal to the supply signal when the battery satisfies the low power condition. The driver determines whether the supply signal satisfies the first low voltage condition according to the driving supply signal. If so, the driver triggers the first alert event for driving the user interface device to trigger the alert event. In other words, the portable computer system of the present embodiment of the invention can directly implement the battery low power alert circuit by way of hardware. Compared with the conventional portable computer system, the portable computer system of the present embodiment of the invention is advantageously capable of displaying the information of the remaining capacity of the battery circuit in a more convenient manner.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable computer system, comprising:
   a battery for providing a supply signal;
   a power switch electrically connected to the battery for receiving the supply signal; and
   a computer unit, comprising:
   an embedded controller (EC) for determining whether the battery satisfies a low power condition in response to the supply signal, wherein the EC further provides a driving supply signal when the battery satisfies the low power condition;
   a driver for determining whether the supply signal satisfies a first low voltage condition according to the driving supply signal, wherein the driver triggers a first alert event when the supply signal satisfies a first low voltage condition related to the level of the supply signal,
   the driver including
   a signal converter for generating a current conversion signal in response to the driving supply signal,
   a Wheatstone bridge for providing a first control voltage signal and a second control voltage signal, wherein the Wheatstone bridge determines a differential voltage signal between the first and the second control voltage signal in response to the current conversion signal, and the magnitude of the differential voltage signal is related to the driving supply signal, and
   a comparison circuit for determining whether the differential voltage signal is substantially larger than a threshold value so as to determine whether the supply signal satisfies the first low voltage condition, wherein the comparison circuit provides a first control signal to trigger the first alert event when the supply signal satisfies the first low voltage condition; and
   a user interface device for triggering a first user notification event in response to the first alert event;
   wherein, the power switch is turned on for providing the supply signal to power the computer unit in response to a first operation event; and
   wherein, the power switch is turned off in response to a second operation event, so that the battery and the computer unit substantially float, and the computer unit is put in a power cut-off situation.

2. The portable computer system according to claim 1, wherein the Wheatstone bridge comprises:
   a signal input node;
   a first node and a second node respectively having the first and the second control voltage signal;
   a first resistor (R6) and a second resistor (R8), wherein the first ends respectively receive a reference high level signal and a reference low level signal, and the second ends are coupled to the second node;
   a third resistor (R7) and a fourth resistor (R9), wherein the first ends respectively receive the reference high level signal and are coupled to the signal input stage point, and the second ends are coupled to the first node; and a fifth resistor (R10), wherein the first end and the second end are respectively coupled to the signal input node and receive the reference low level signal.

3. The portable computer system according to claim 2, wherein the first to the fifth resistors satisfy the condition:

$$R2 \times R3 = R1 \times (R4+R5),$$

wherein R1-R5 respectively denote the first to the fifth resistors.

4. The portable computer system according to claim 1, wherein the user interface device comprises:

a light emitting diode (LED) circuit for generating an alert optical signal in response to the first control signal to trigger the first user notification event.

5. The portable computer system according to claim 1, wherein the driver determines whether the supply signal satisfies a second low voltage condition according to the driving supply signal, and further triggers a second alert event when the supply signal satisfies the second low voltage condition related to the level of the supply signal;

wherein, the user interface device further triggers a second user notification event in response to the second the alert event.

6. The portable computer system according to claim 1, wherein the driver comprising:

a coder decoder (CODEC) circuit for providing a first audio control signal to trigger the first alert event; and wherein the user interface device further comprises:

an audio amplifier for generating an amplification audio control signal in response to the first audio control signal; and a speaker circuit turned on for generating an alert audio signal in response to the first amplification audio control signal and triggering the first user notification event.

* * * * *